Patented Nov. 20, 1928.

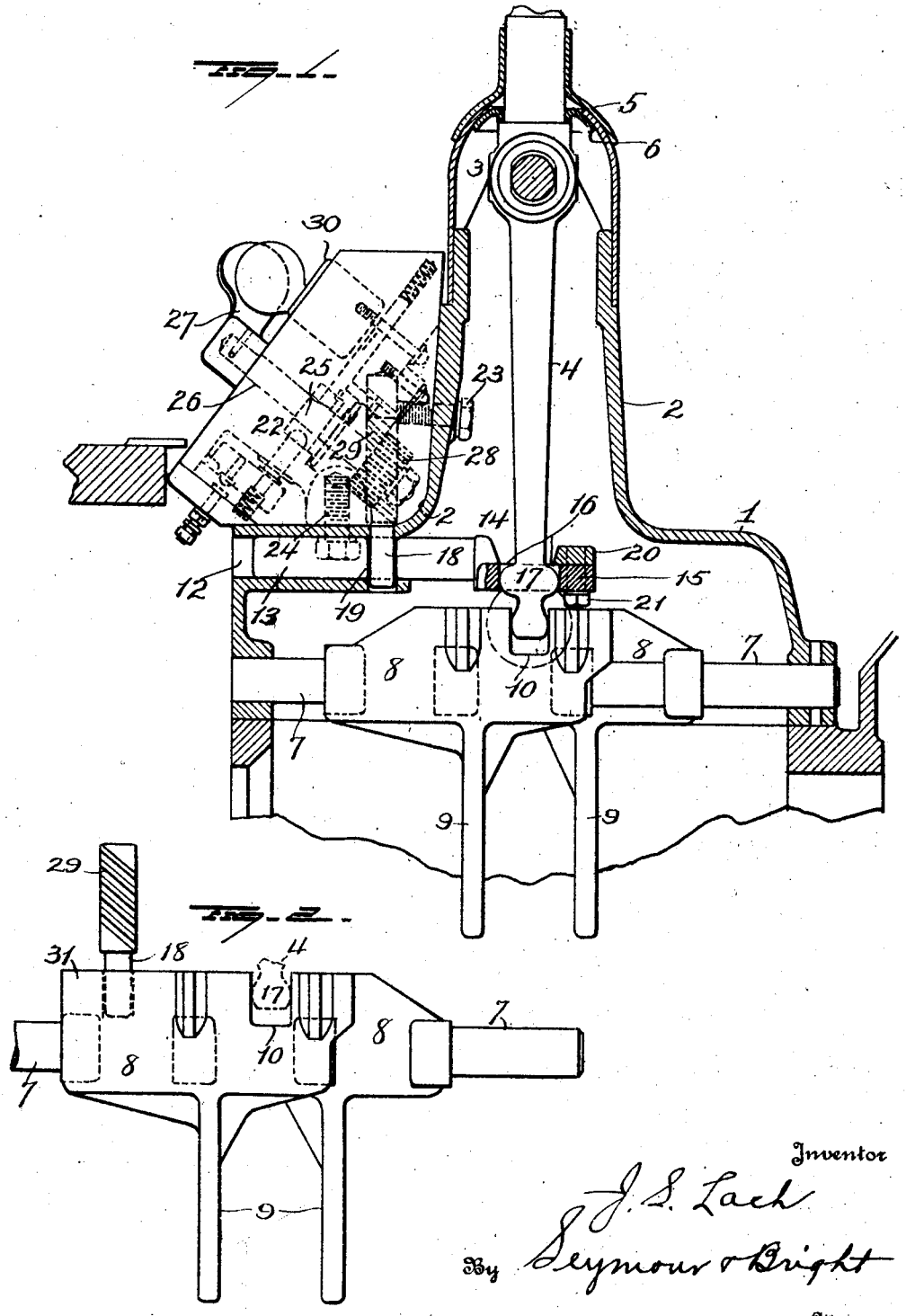

1,692,668

UNITED STATES PATENT OFFICE.

JOSEPH S. LACH, OF BRIDGEPORT, CONNECTICUT, ASSIGNOR TO THE YALE & TOWNE MANUFACTURING COMPANY, OF STAMFORD, CONNECTICUT.

AUTOMOBILE LOCK MEANS.

Application filed August 4, 1926. Serial No. 127,089.

This invention relates to improvements in locking means for automobiles, and more particularly to means for locking the transmission control mechanism,—one object of the invention being to provide simple and efficient means which may be compactly assembled and associated directly with the dome member of the transmission casing and be manually operable under the control of key operated control means to lock the shifting mechanism of the transmission control means.

With this and other objects in view, the invention consists in certain novel features of construction and combinations of parts as hereinafter set forth and pointed out in the claim.

In the accompanying drawings;

Figure 1 is a sectional view, partly in elevation, showing an embodiment of my invention, and Figure 2 is a view showing a modification.

The transmission casing of an automobile is indicated at 1 and the transmission gearing (not shown) may be of any approved construction and arrangement in which shiftable gears and clutch means are employed. The casing 1 has mounted thereon, a dome, casing or housing member 2 and this dome provides a mounting at 3 for a shift lever 4. The shift lever is assembled in the casing dome by first passing the lower portion of said lever downwardly into the dome and said lever may be provided with a guard 5 which is movable on the upper portion of the dome, and another guard 6 may be carried by the lever and bear against the inner face of the dome around the opening through which the lever passes.

Suitable supports, such as indicated at 7 are provided in the casing or housing member, for the accommodation of sliding shift blocks or members 8 having arms 9 for co-operation with the shiftable members of the transmission mechanism. The shift blocks are recessed as at 10 to receive the lower end portion 11 of the shift lever 4.

Above the horizontal plane of the shift blocks and their supports, a horizontal guideway 12 open at both ends is provided in the casing member 2 for the accommodation of the bar 13 of a shift lever locking device 14. This lever locking device 14 also includes a rectangular frame 15 at the inner end of the bar 13 and preferably disposed in a plane somewhat below that of the axis of said bar. Within the elongated opening 16 of the frame 15, an enlargement 17 on the lever 4 is movable to permit the end portion of said lever to be shifted into the recess 10 of one or the other of the shift blocks or members 8, but the opening in said frame is so proportioned that the lever 4 cannot be operated to shift either of the blocks if the locking device 14 be locked against movement. The means for locking the device 14 consists of a bolt 18 which is movable through suitable holes in the wall of the casing member 2 and the lower wall of the guideway 12 and through a hole 19 which extends transversely through the bar 13, as shown in Figure 1. To insure retention of the enlargement 17 of the shift lever in the opening of the frame 15, a plate or bar 20 is secured to the forward bar of the frame and caused to project over said opening,—said plate or bar 20 being secured to the frame by means of screws 21 passing upwardly through the frame bar and entering said bar 20, as shown in Figure 1.

Located at one side of the dome and over the base of the member 2 of the transmission casing, is a casing 22 secured in place by bolts 23, 24, and into said casing 22, the bolt 18 extends. The casing 22 contains manually operable means 25 which includes a shaft 26 operable by a lever handle 27, and a pinion 28 secured to said shaft having intermeshing relation with rack teeth 29 with which the bolt 18 is provided. The bolt thus constitutes a rack bar to which motion is imparted by the pinion when the shaft 26 is turned to either project or retract the bolt. The operation of the manually operable shaft is controlled by key-controlled locking mechanism 30 also contained in the casing 22.

Instead of employing the device 14 for locking the shift lever when said device is engaged by the bolt 18, said device may be omitted and the bolt caused to engage the shift blocks directly. In such event, the shift blocks may be made with enlargements such as shown at 31, Figure 2, and said enlargements provided with recesses to receive the bolt 18, as illustrated in said Figure 2.

Having fully described my invention, what I claim as new and desired to secure by Letters-Patent, is:—

The combination with a transmission housing member, shift block, and a shifting member cooperative with said shift blocks, of a lock casing secured to said housing, a bolt mounted in said casing and movable through the top of the housing to engage the shifting member, said bolt having rack teeth, a manually operable shaft mounted in the lock casing, a pinion carried by said shaft and meshing with the rack teeth on the bolt, and key-controlled means mounted in the lock casing for controlling the operation of said shaft.

In testimony whereof, I have signed this specification.

JOSEPH S. LACH.